(12) United States Patent
Araki

(10) Patent No.: US 11,614,695 B2
(45) Date of Patent: Mar. 28, 2023

(54) IMAGE FORMING APPARATUS AND OPTICAL SENSOR

(71) Applicant: CANON KABUSHIKI KAISHA, Tokyo (JP)

(72) Inventor: Ryuichi Araki, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/393,071

(22) Filed: Aug. 3, 2021

(65) Prior Publication Data

US 2021/0364941 A1 Nov. 25, 2021

Related U.S. Application Data

(63) Continuation of application No. 16/562,996, filed on Sep. 6, 2019, now Pat. No. 11,126,104.

(30) Foreign Application Priority Data

Sep. 10, 2018 (JP) .............................. JP2018-168418

(51) Int. Cl.
| | | |
|---|---|---|
| *G03G 15/16* | (2006.01) | |
| *G03G 15/01* | (2006.01) | |
| *G03G 15/00* | (2006.01) | |
| *G01N 21/25* | (2006.01) | |
| *G01N 21/27* | (2006.01) | |

(52) U.S. Cl.
CPC ....... *G03G 15/0131* (2013.01); *G01N 21/255* (2013.01); *G01N 21/27* (2013.01); *G03G 15/5025* (2013.01); *G03G 15/6561* (2013.01); *G01N 2201/0626* (2013.01)

(58) Field of Classification Search
USPC ........................................................... 399/66
See application file for complete search history.

(56) References Cited

U.S. PATENT DOCUMENTS

| 10,031,459 B2 | 7/2018 | Ino et al. |
| 10,095,171 B2 | 10/2018 | Shirafuji et al. |
| 2005/0030562 A1 | 2/2005 | Hama et al. |
| 2011/0043810 A1 | 2/2011 | Suzuki et al. |
| 2011/0076040 A1 | 3/2011 | Uchidate et al. |
| 2013/0302050 A1* | 11/2013 | Shimba .................. G03G 15/01 399/49 |

(Continued)

FOREIGN PATENT DOCUMENTS

JP 10-031333 A 2/1998

*Primary Examiner* — Quana Grainger
(74) *Attorney, Agent, or Firm* — Venable LLP

(57) ABSTRACT

An image forming apparatus includes an optical sensor configured to detect an image formed on an intermediate transfer belt. The optical sensor includes a first light emitting diode (LED), a second LED, a first photodiode (PD), and a second PD on a substrate. The first PD is arranged at a position at which specularly reflected light of light emitted from the first LED can be received, and scattered reflected light of light emitted from the second LED can be received. The second PD is arranged at a position at which scattered reflected light of light emitted from the second LED can be received. A light receiving surface of the first PD and a light receiving surface of the second PD are formed at different angles. The light receiving surface of the first PD has an area that is smaller than an area of the light receiving surface of the second PD.

10 Claims, 12 Drawing Sheets

(56) References Cited

U.S. PATENT DOCUMENTS

2014/0079443 A1 3/2014 Nanai
2015/0043936 A1 2/2015 Masuda et al.
2015/0261163 A1 9/2015 Ishii et al.

* cited by examiner

[FIRST STATE]

[SECOND STATE]

[THIRD STATE]

IMAGE FORMING APPARATUS AND OPTICAL SENSOR

BACKGROUND OF THE INVENTION

Field of the Invention

The present disclosure relates to an optical sensor including a plurality of light emitting elements configured to irradiate an image bearing member with light, and a plurality of light receiving elements configured to receive reflected light of light emitted from the plurality of light emitting elements, and to an image forming apparatus including the optical sensor.

Description of the Related Art

An electrophotographic image forming apparatus is configured to form images of colors of yellow (Y), magenta (M), cyan (C), and black (K) on a sheet through electrophotographic processes of charging, exposing, developing, and transferring. Densities of the images formed on the sheet are varied depending on temperature and humidity of the image forming apparatus, the number of prints of the image forming apparatus, and operating time of the image forming apparatus. To address this problem, the image forming apparatus is configured to form a test image for density detection on an image bearing member, which is different from the sheet, detect the test image for density detection by an optical sensor included in the image forming apparatus, and adjust an image density based on a result of the detection.

The image forming apparatus is also configured to superimpose images of different colors to form an image of mixed colors. Therefore, when image forming positions of the yellow image, the magenta image, the cyan image, and the black image are different, a tint of the image of the mixed colors does not become a desired tint. This is called "color misregistration". It is known that the color misregistration is also varied depending on the temperature and humidity of the image forming apparatus, the number of prints of the image forming apparatus, and the operating time of the image forming apparatus as with the densities of the images described above. In order to address this problem, the image forming apparatus is configured to correct the color misregistration before the tint of the color image is changed. For example, the image forming apparatus is configured to form pattern images for detecting the color misregistration on the image bearing member, detect the pattern images for detecting the color misregistration by the optical sensor, and adjust the image forming positions of the respective colors based on a result of the detection.

The optical sensor included in the image forming apparatus includes a light emitter, and a light receiver configured to receive reflected light from the detection image (test image and pattern images) on the image bearing member. Methods of detecting the detection image by the optical sensor include a specularly reflected light method of detecting specularly reflected light from the detection image, and a scattered reflected light method (diffusely reflected light method) of detecting scattered reflected light from the detection image. For example, an image forming apparatus described in Japanese Patent Application Laid-open No. Hei 10-031333 is configured to execute, by an optical sensor including two light emitting elements and two light receiving elements, processing of detecting specularly reflected light from a detection image, and processing of detecting scattered reflected light from the detection image.

However, the optical sensor described in Japanese Patent Application Laid-open No. Hei 10-031333 is assembled by soldering bullet light emitting elements and bullet light receiving elements on a substrate, and hence it is difficult to reduce the size of the optical sensor. Further, when a light receiving element for detecting color misregistration and a light receiving element for detecting an image density are to be mounted on one sensor, possible arrangements of those light receiving elements is restricted, and hence it is difficult for the optical sensor to receive reflected light at an ideal angle from the detection image. Therefore, in the image forming apparatus including the optical sensor including the bullet element for detecting color misregistration and the bullet element for detecting the image density, there has been a fear that a color misregistration amount and an image density cannot be detected with high accuracy.

Moreover, the inventors of the present disclosure have found that light receiving modes that are appropriate for the object to be measured are required. Specifically, the light receiving modes include a mode in which a change in a sensor output value of an optical sensor is steep, and a mode in which the change in a sensor output value of the optical sensor is mild. The mode in which the sensor output is changed steeply is suited for detection of pattern images for detecting color misregistration, for example. This is because, in the color misregistration detection, it is desired to detect a timing at which the pattern images reach a detection region of the sensor with high accuracy. Meanwhile, the mode in which the sensor output is changed mildly is suited for detection of a test image for detecting a density, for example. This is because, when the sensor output is changed steeply, the sensor output value is varied due to inconsistencies in density of the test image for detecting the density.

In view of the above-mentioned problem, in order to measure different objects to be measured, consideration is given to a configuration in which a conveyance speed of a detection image (test image and pattern images) is changed depending on the object to be measured. However, the image to be formed on a sheet and the detection image are formed on the same image bearing member, and hence when the conveyance speed of the image bearing member is reduced to form the detection image, down time is disadvantageously increased. It is an object of the present disclosure to downsize an optical sensor configured to enable measurement suited for different objects to be measured.

SUMMARY OF THE INVENTION

An image forming apparatus according to the present disclosure includes an image forming unit configured to form an image; an image bearing member configured to bear the image formed by the image forming unit; a transfer portion at which the image is transferred from the image bearing member onto a sheet; a sensor configured to detect reflected light from a detection image formed on the image bearing member; and a controller configured to control the image forming unit to form the detection image on the image bearing member, and control the sensor to detect the reflected light from the detection image, wherein the sensor includes a substrate; a first light emitting element provided on the substrate; a second light emitting element provided on the substrate; a first light receiving element, which is provided on the substrate, and is configured to receive specularly reflected light from the detection image in a case where the first light emitting element irradiates the detection image with light; and a second light receiving element, which is provided on the substrate, and is configured to receive scattered reflected light from the detection image in a case where the second light emitting element irradiates the detection image with light, and wherein an area of a light receiving surface of the first light receiving element is smaller than an area of a light receiving surface of the second light receiving element.

Further features of the present invention will become apparent from the following description of exemplary embodiments (with reference to the attached drawings).

DESCRIPTION OF THE EMBODIMENTS

Now, at least one embodiment of the present disclosure is described in detail with reference to the drawings.

Overall Configuration

Figure 1:
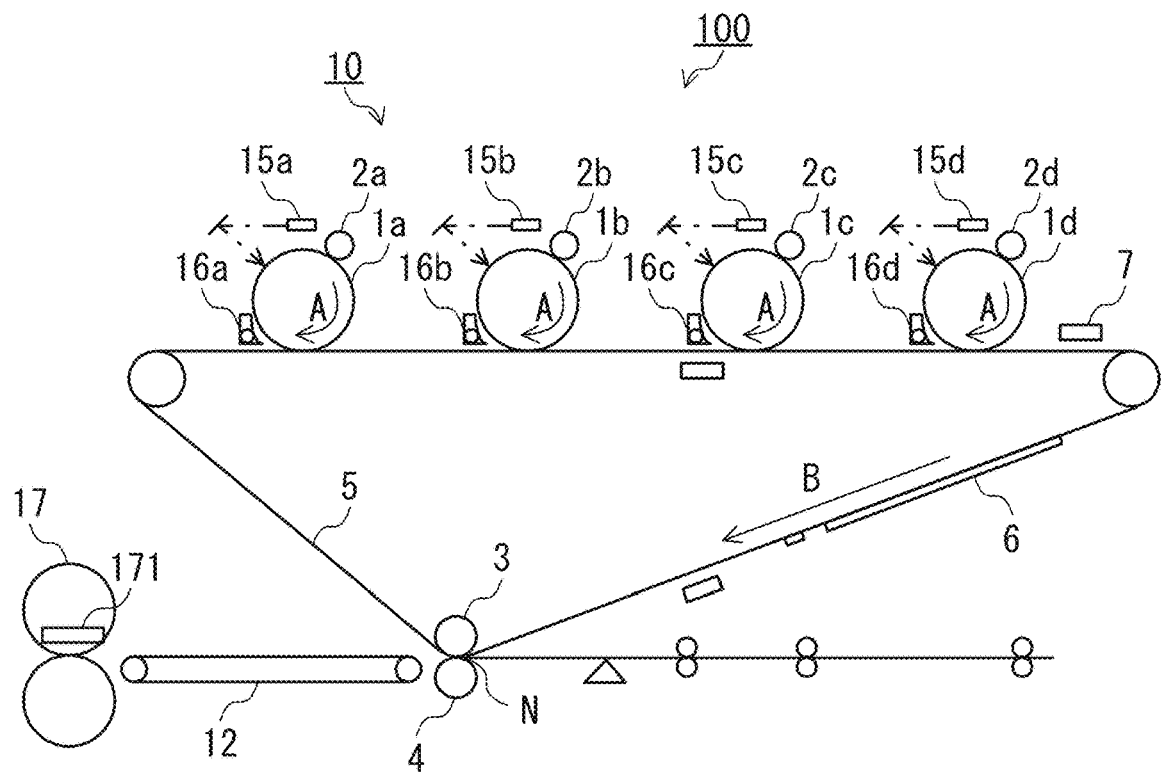
FIG. 1 is a schematic cross-sectional view of an image forming apparatus according to at least one embodiment of the present disclosure.

FIG. 1 is a schematic cross-sectional view of an image forming apparatus 100 according to at least one embodiment. The image forming apparatus 100 includes photosensitive drums 1a to 1d, charging devices 2a to 2d, exposure devices 15a to 15d, developing devices 16a to 16d, an intermediate transfer belt 5, a belt support roller 3, a transfer roller 4, and a fixing device 17. In the following description, the photosensitive drums 1a to 1d, the charging devices 2a to 2d, the exposure devices 15a to 15d, and the developing devices 16a to 16d are referred to as an "image forming unit 10" configured to form yellow (Y), cyan (C), magenta (M), and black (K) toner images. The letter "a" suffixed to the reference signs represents a configuration for forming the yellow image. The letter "b" suffixed to the reference signs represents a configuration for forming the cyan image. The letter "c" suffixed to the reference signs represents a configuration for forming the magenta image. The letter "d" suffixed to the reference signs represents a configuration for forming the black image.

The intermediate transfer belt 5 is wound around a plurality of rollers including a drive roller and the belt support roller 3. To the intermediate transfer belt 5, the toner images formed by the image forming unit 10 are transferred. The intermediate transfer belt 5 serves as an image bearing member configured to bear and convey the toner images. Moreover, the intermediate transfer belt 5 also serves as an intermediate transfer member, to which the toner images are to be transferred. The transfer roller 4 is arranged on a side opposite to the belt support roller 3 with respect to the intermediate transfer belt 5. A nip portion N formed by the transfer roller 4 pressing the intermediate transfer belt 5 is called a "transfer portion". The sheet is conveyed to the nip portion N by conveyance rollers. The transfer roller 4 is configured to transfer the toner images formed on the intermediate transfer belt 5 onto the sheet at the nip portion N.

The photosensitive drums 1a, 1b, 1c, and 1d are each rotated in a direction of the arrow A. The photosensitive drums 1a, 1b, 1c, and 1d each have a photosensitive layer on a surface thereof. The photosensitive drums 1a, 1b, 1c, and 1d serve as photosensitive members. The charging devices 2a, 2b, 2c, and 2d are configured to charge the surfaces of the photosensitive drums 1a, 1b, 1c, and 1d, respectively. The exposure devices 15a, 15b, 15c, and 15d are configured to expose the charged surfaces of the photosensitive drums 1a, 1b, 1c, and 1d to light, respectively. The surfaces of the photosensitive drums 1a, 1b, 1c, and 1d are scanned with laser light emitted from the exposure devices 15a, 15b, 15c, and 15d so that electrostatic latent images are formed on the surfaces of the photosensitive drums 1a, 1b, 1c, and 1d, respectively. The developing devices 16a, 16b, 16c, and 16d are configured to develop the electrostatic latent images with toner (developer) to form the toner images of respective colors on the photosensitive drums 1a, 1b, 1c, and 1d, respectively.

The drive roller of the intermediate transfer belt 5 is rotated to rotate the intermediate transfer belt 5 in a direction of the arrow B. The toner images of respective colors formed on the photosensitive drums 1a, 1b, 1c, and 1d are sequentially transferred onto the intermediate transfer belt 5, which is the image bearing member, in an overlapping manner. As a result, a full-color toner image 6 is formed on the intermediate transfer belt 5.

The intermediate transfer belt 5 is rotated to convey the toner image 6 to the nip portion N. The toner image 6 is transferred onto the sheet when passing through the nip portion N. The sheet having the toner image 6 transferred thereto is conveyed to the fixing device 17 by a conveyance belt 12. The fixing device 17 includes a heater 171. The heater 171 is configured to heat the toner image 6 to fix the toner image 6 onto the sheet. Then, the sheet is delivered to a tray (not shown) of the image forming apparatus 100. In this manner, image forming processing by the image forming apparatus 100 is ended.

On a downstream side of the photosensitive drum 1d in a conveyance direction (direction B) of the intermediate transfer belt 5, an optical sensor 7 is arranged. The optical sensor 7 is configured to detect pattern images for detecting color misregistration and a test image for detecting an image density, which are formed on the intermediate transfer belt 5. A result of detecting the pattern images is used to determine a color misregistration amount, which is used for color misregistration correction. A result of detecting the test image is used to determine a correction amount to be used for image density correction. In the following, when the pattern images and the test image are not distinguished, the pattern images and the test image are referred to as a "detection image".

The toner images of respective colors, which are transferred from the photosensitive drums 1a to 1d onto the intermediate transfer belt 5, may be shifted in transfer position on the intermediate transfer belt 5. It is known that this is caused by an increase in temperature of the exposure devices 15a to 15d. The shift in transfer position causes color misregistration, which changes a hue and a color tone of the full-color image. To address this problem, the image forming apparatus 100 is configured to detect the pattern images by the optical sensor 7, and correct the color misregistration detected by a result of the detection.

Moreover, the image forming apparatus 100 may vary in density of the image to be formed due to a usage environment (temperature and humidity) and an increase in number of prints. To address this problem, the image forming apparatus 100 is configured to detect the test image by the optical sensor 7, and perform image density correction, in which an image forming condition regarding an image density is controlled based on a result of detecting the test image. In this case, the image forming condition regarding the image density includes intensities of laser light to be emitted by the exposure devices 15a to 15d, developing biases to be applied to the developing devices 16a to 16d, charging biases to be applied to the charging devices 2a to 2d, or transfer biases to be applied to the transfer roller 4, for example. In order to correct the image density, the image forming apparatus 100 may control a plurality of image forming conditions, or control only a particular image forming condition.

Optical Sensor

Figure 2:
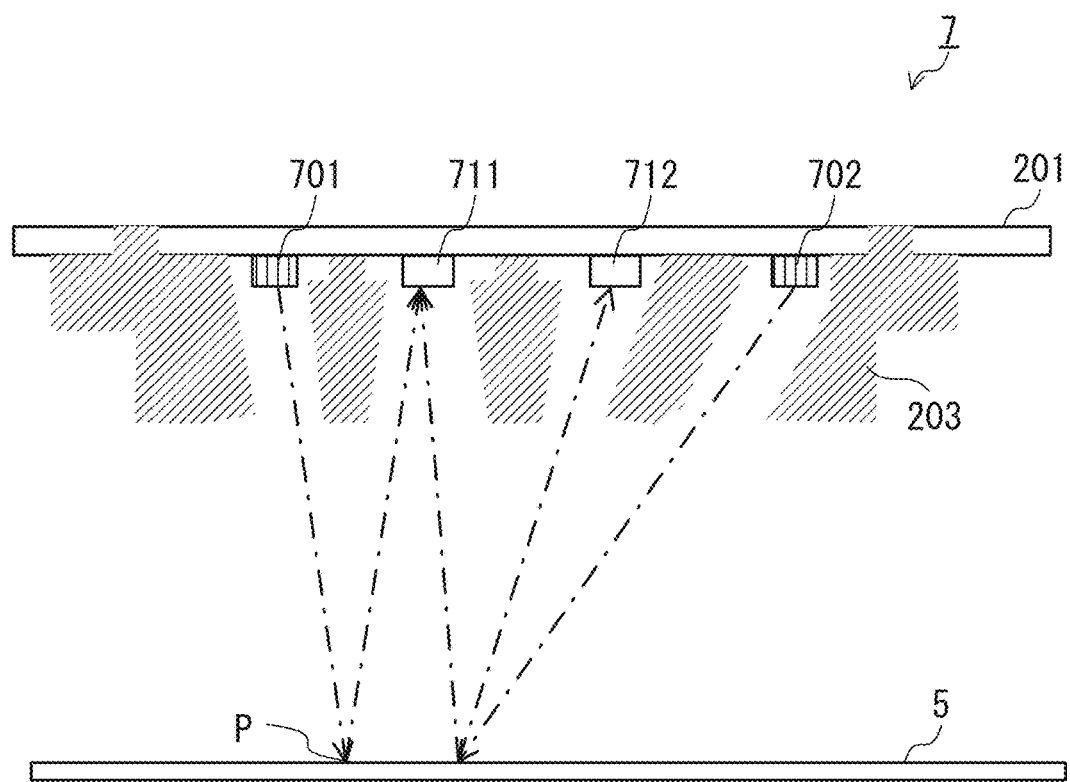
FIG. 2 is a schematic view of a main part of an optical sensor.

FIG. 2 is an explanatory diagram of the optical sensor 7. The optical sensor 7 includes two light emitting elements and two light receiving elements. The optical sensor 7 includes two light emitting diodes (LEDs) (first LED 701 and second LED 702) as the light emitting elements. The optical sensor 7 includes two photodiodes (PDs) (first PD 711 and second PD 712) as the light receiving elements. The first LED 701, the second LED 702, the first PD 711, and the second PD 712 are arranged side by side in a predetermined direction on a predetermined surface (mounting surface) of the same substrate 201, and bonded thereto by die bonding and wire bonding.

The substrate 201 is a printed circuit board (PCB), for example, but the present disclosure is not limited thereto. The first LED 701, the second LED 702, the first PD 711, and the second PD 712 are electrically connected to a power supply circuit (not shown) and a detection circuit (not shown), for example, via the substrate 201.

The first LED 701 is configured to emit light to an object to be measured (intermediate transfer belt 5 or detection image on the intermediate transfer belt 5). The first PD 711 is arranged at a position at which, when the first LED 701 emits light, specularly reflected light from the object to be measured can be received. A point P of FIG. 2 indicates a position at which the light emitted from the first LED 701 to the intermediate transfer belt 5 is reflected. In other words, the first LED 701 and the first PD 711 are arranged such that the light emitted from the first LED 701 is specularly reflected (so that an angle of incidence and an angle of reflection are equal to each other) at the point P, and the reflected light is received by the first PD 711.

The second LED 702 is arranged at a position at which specularly reflected light of light emitted to the intermediate transfer belt 5 is not received by the first PD 711 or the second PD 712. In other words, the second LED 702 is arranged such that, even when the light emitted from the second LED 702 is specularly reflected by the intermediate transfer belt 5, the reflected light is not received by the first PD 711 or the second PD 712. Even when the light emitted from the second LED 702 is specularly reflected by the detection image, the specularly reflected light from the detection image is not received by the first PD 711 or the second PD 712. The second LED 702 is arranged at a position at which scattered reflected light of the light emitted to the intermediate transfer belt 5 is received by the first PD 711 and the second PD 712. The first LED 701 and the second LED 702 are arranged to irradiate different positions on the intermediate transfer belt 5.

The first PD 711 is arranged at a position at which the specularly reflected light of light emitted from the first LED 701 to the intermediate transfer belt 5, and scattered reflected light of light emitted from the second LED 702 to the intermediate transfer belt 5 are received. The second PD 712 is arranged at a position at which scattered reflected light of light emitted from the second LED 702 to the intermediate transfer belt 5 is received. The second PD 712 is not arranged at the position at which the specularly reflected light of the light emitted from the first LED 701 to the intermediate transfer belt 5 is received. The first PD 711 and the second PD 712 are not arranged at positions at which the specularly reflected light of the light irradiated from the second LED 702 to the intermediate transfer belt 5 is received.

The substrate 201 is mounted to a housing 203. The housing 203 has light guide paths for guiding irradiation light so that light emitted from the first LED 701 and the second LED 702 efficiently irradiate the intermediate transfer belt 5. The housing 203 also has light guide paths for guiding the reflected light so that the first PD 711 and the second PD 712 efficiently receive the reflected light from the intermediate transfer belt 5.

In other words, the light emitted from the first LED 701 travels in the direction of the optical axis (one-dot broken line in FIG. 2), and irradiates the intermediate transfer belt 5, with the light guide path formed in the housing 203. The specularly reflected light from the object to be measured travels in the direction of the optical axis (one-dot broken line in FIG. 2), and reaches the first PD 711, with the light guide path formed in the housing 203.

The light emitted from the second LED 702 travels in the direction of the optical axis (one-dot broken line in FIG. 2), and irradiates the intermediate transfer belt 5, with the light guide path in the housing 203.

When the second LED 702 emits light, the first PD 711 receives the scattered reflected light from the intermediate transfer belt 5 through the light guide path formed in the housing 203. In contrast, when the first LED 701 emits light, the first PD 711 receives specularly reflected light from the intermediate transfer belt 5 through the light guide path formed in the housing 203.

When the image forming apparatus 100 detects the color misregistration based on a result of receiving the specularly reflected light, the image forming apparatus 100 causes the first LED 701 to emit light, and causes the first PD 711 to receive specularly reflected light from the pattern images formed on the intermediate transfer belt 5. This is called "specular reflection color misregistration detection". Further, when the image forming apparatus 100 detects the image density based on a result of receiving the specularly reflected light, the image forming apparatus 100 causes the first LED 701 to emit light, and causes the first PD 711 to receive specularly reflected light from the test image formed on the intermediate transfer belt 5. This is called "specular reflection density detection". Further, when the image forming apparatus 100 detects the color misregistration based on a result of receiving the scattered reflected light, the image forming apparatus 100 causes the second LED 702 to emit light, and causes the first PD 711 to receive scattered reflected light from the pattern images formed on the intermediate transfer belt 5. This is called "scattered reflection color misregistration detection".

When the second LED 702 emits light, the second PD 712 receives the scattered reflected light from the intermediate transfer belt 5 through the light guide path formed in the housing 203. When the image forming apparatus 100 detects the color misregistration based on a result of receiving the scattered reflected light, the image forming apparatus 100 causes the second LED 702 to emit light, and causes the second PD 712 to receive scattered reflected light from the test image formed on the intermediate transfer belt 5. This is called "scattered reflection density detection".

The first LED 701, the second LED 702, the first PD 711, and the second PD 712 are mounted on the same substrate 201, and hence the elements can be mounted substantially in parallel to the intermediate transfer belt 5. Therefore, the shift of the optical axis from the optical-axis center point P can be reduced as compared to the case of forming the elements by bullet elements with lead pins, for example. Further, the first LED 701, the second LED 702, the first PD 711, and the second PD 712 are elements bonded to the substrate 201 by die bonding and wire bonding, and hence can be reduced in element interval. Therefore, the entire size of the optical sensor 7 can be reduced. For example, while dimensions of a general element (chip) manufactured by crystal growth are about 3 mm×2 mm×1 mm, dimensions of a bullet element are about 5 mm×10 mm×5 mm even without the lead pins. Therefore, the optical sensor 7 in which the elements are bonded to the substrate by die bonding and wire bonding can significantly reduce a part volume, and can downsize the optical sensor 7 itself.

Figure 3A:
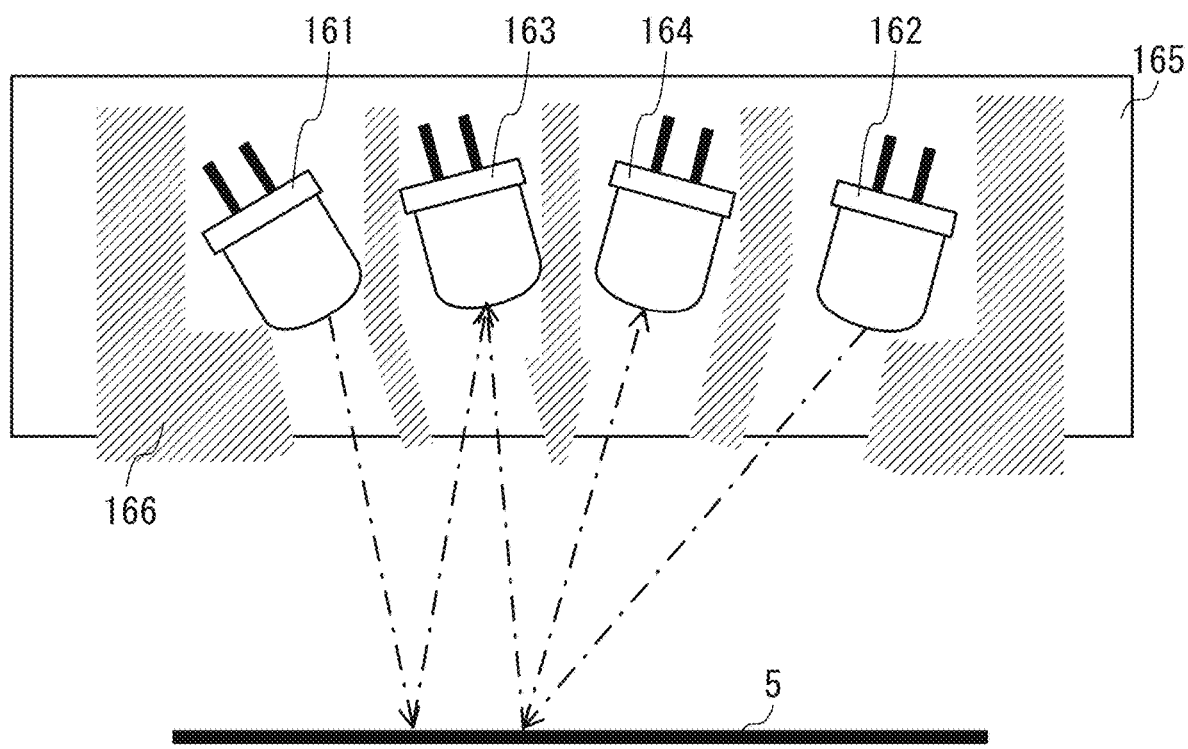
FIG. 3A and FIG. 3B are schematic views of a main part of an optical sensor including bullet elements.
Figure 3B:
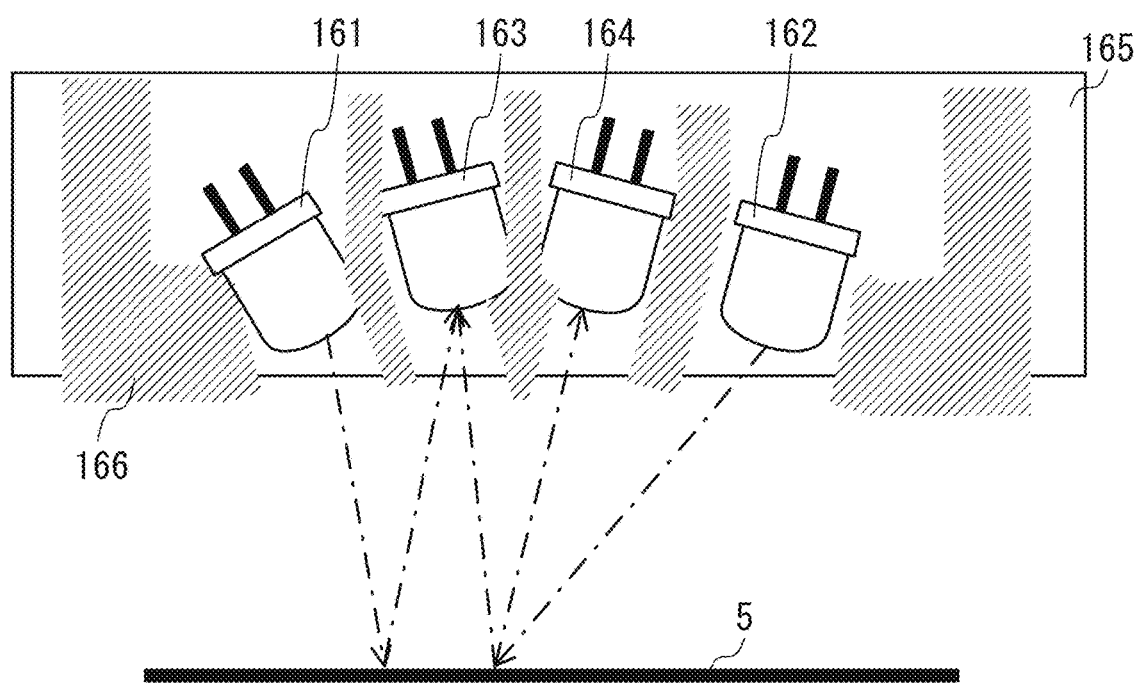

Now, as a comparative example, an optical sensor including bullet elements is described. FIG. 3A and FIG. 3B are explanatory diagrams of the optical sensor including the bullet elements. When a positional relationship between light emitting elements 161 and 162 and light receiving elements 163 and 164 is achieved by a relationship similar to the case in which the elements are bonded to the substrate by die bonding and wire bonding (irradiation angle, receiving angle), it is required to bring the light emitting element 161 and the light receiving element 163 closer to each other. An example of the above-mentioned configuration is illustrated in FIG. 3B. When the light emitting element 161 and the light receiving element 163 have the positional relationship similar to that of FIG. 2 with respect to the intermediate transfer belt 5, the light emitting element 161 and the light receiving element 163 are brought too close to each other. As a result, a function as a light-shielding wall of the housing 166 provided on a substrate 165 is inhibited. Therefore, in order to prevent the light emitting elements 161 and 162 and the light receiving elements 163 and 164 from interfering with the light-shielding wall, it is required to increase the interval between the elements as in FIG. 3A, but in this case, the optical sensor is increased in size.

As described above, in the optical sensor 7 in at least one embodiment, the light emitting units and the light receiving units are bonded to the substrate 201 by die bonding and wire bonding. With the first LED 701, the second LED 702, the first PD 711, and the second PD 712 being bonded to the substrate 201 by die bonding and wire bonding, the distance between the elements can be reduced. As a result, the optical sensor 7 can be downsized as compared to the optical sensor including the bullet elements (FIG. 3A and FIG. 3B). Further, the optical sensor 7 can reduce the distance between the first LED 701 and the first PD 711, and hence design flexibility is also increased. Therefore, according to the optical sensor 7, the first LED 701, the second LED 702, the first PD 711, and the second PD 712 can be arranged in a positional relationship that is suitable for detecting the specularly reflected light and the scattered reflected light from the object to be measured. In particular, in the optical sensor 7 in which the light emitting elements are shared or the light receiving elements are shared, the specularly reflected light and the scattered reflected light from the detection image can be detected more accurately than in the related-art optical sensor including the bullet elements.

Controller

Figure 4:
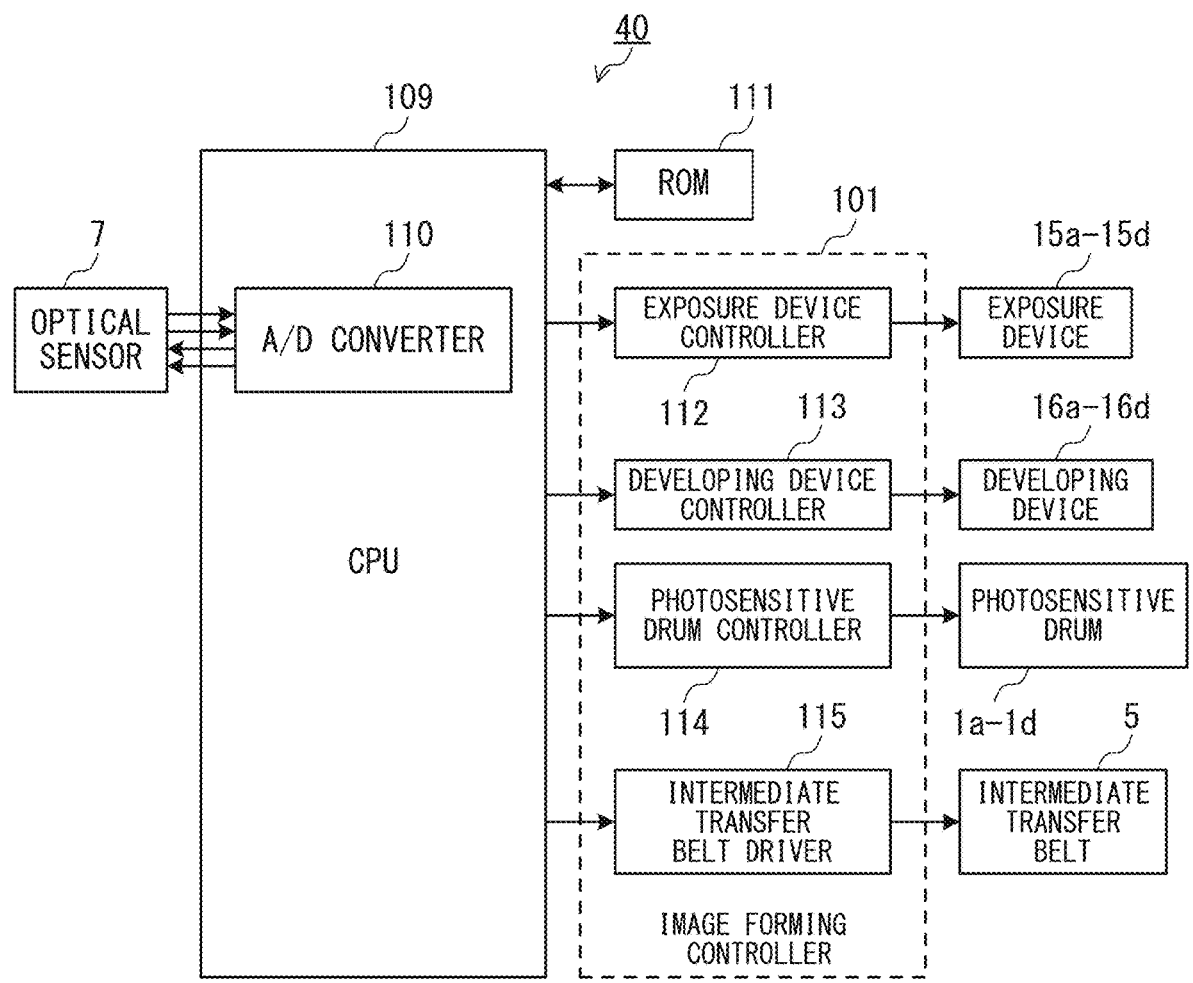
FIG. 4 is a control block diagram of the image forming apparatus.

Now, returning to the description of the image forming apparatus 100 of at least one embodiment. FIG. 4 is an exemplary diagram of an example of a configuration of a controller configured to control the image forming apparatus 100. A controller 40 includes a central processing unit (CPU) 109, a read-only memory (ROM) 111, and an image forming controller 101. The CPU 109 includes an A/D converter 110. The image forming controller 101 includes an exposure device controller 112, a developing device controller 113, a photosensitive drum controller 114, and an intermediate transfer belt driver 115. The exposure device controller 112 is configured to control intensities of laser light emitted from light sources included in the exposure devices 15a to 15d. The developing device controller 113 is configured to control motors for rotating developing rollers included in the developing devices 16a to 16d. The photosensitive drum controller 114 is configured to control motors for rotating the photosensitive drums 1a to 1d. The intermediate transfer belt driver 115 is configured to control a motor for rotating the intermediate transfer belt 5. The CPU 109 is configured to control the image forming apparatus 100 by executing a computer program stored in the ROM 111. In the ROM 111, in addition to the computer program, pattern image data and test image data are stored. The pattern image data is to be used to form the pattern images for the color misregistration detection, which are to be described later, and test image data is to be used for forming the test image for the image density detection. The controller 40 may be implemented not only by executing the computer program, but also by a discrete part or a one-chip semiconductor product. The one-chip semiconductor product includes a micro-processing unit (MPU), an application specific integrated circuit (ASIC), or a system-on-a-chip (SOC), for example.

The CPU 109 is configured to control the optical sensor 7 to cause the first LED 701 and the second LED 702 to independently emit light (be lit).

The optical sensor 7 is configured to receive reflected light from the intermediate transfer belt 5 or the detection image formed on the intermediate transfer belt 5 by the first PD 711 and the second PD 712. The first PD 711 and the second PD 712 are configured to output, as a detection result, an analog signal obtained by converting the received reflected light into a voltage. The CPU 109 is configured to acquire analog signals output from the first PD 711 and the second PD 712 through the A/D converter 110. The CPU 109 is configured to store, in a memory (not shown), digital signals into which the analog signals are converted by the A/D converter 110.

The CPU 109 is configured to control the exposure devices 15a to 15d, the developing devices 16a to 16d, and the photosensitive drums 1a to 1d by the image forming controller 101 to form the detection image on the intermediate transfer belt 5. The CPU 109 is configured to control the first LED 701 and the second LED 702 of the optical sensor 7 to be lit. The first LED 701 and the second LED 702 are configured to irradiate the surface (front surface) of the intermediate transfer belt 5, on which the detection image is to be formed, and the detection image formed on the intermediate transfer belt 5. The first PD 711 and the second PD 712 are configured to receive reflected light from the front surface of the intermediate transfer belt 5 and the detection image formed on the intermediate transfer belt 5 to output an analog signal corresponding to the reflected light. The CPU 109 is configured to detect the color misregistration amount and the image density in accordance with the analog signals output from the first PD 711 and the second PD 712 to perform the color misregistration correction and the image density correction.

Pattern Images

Figure 5:
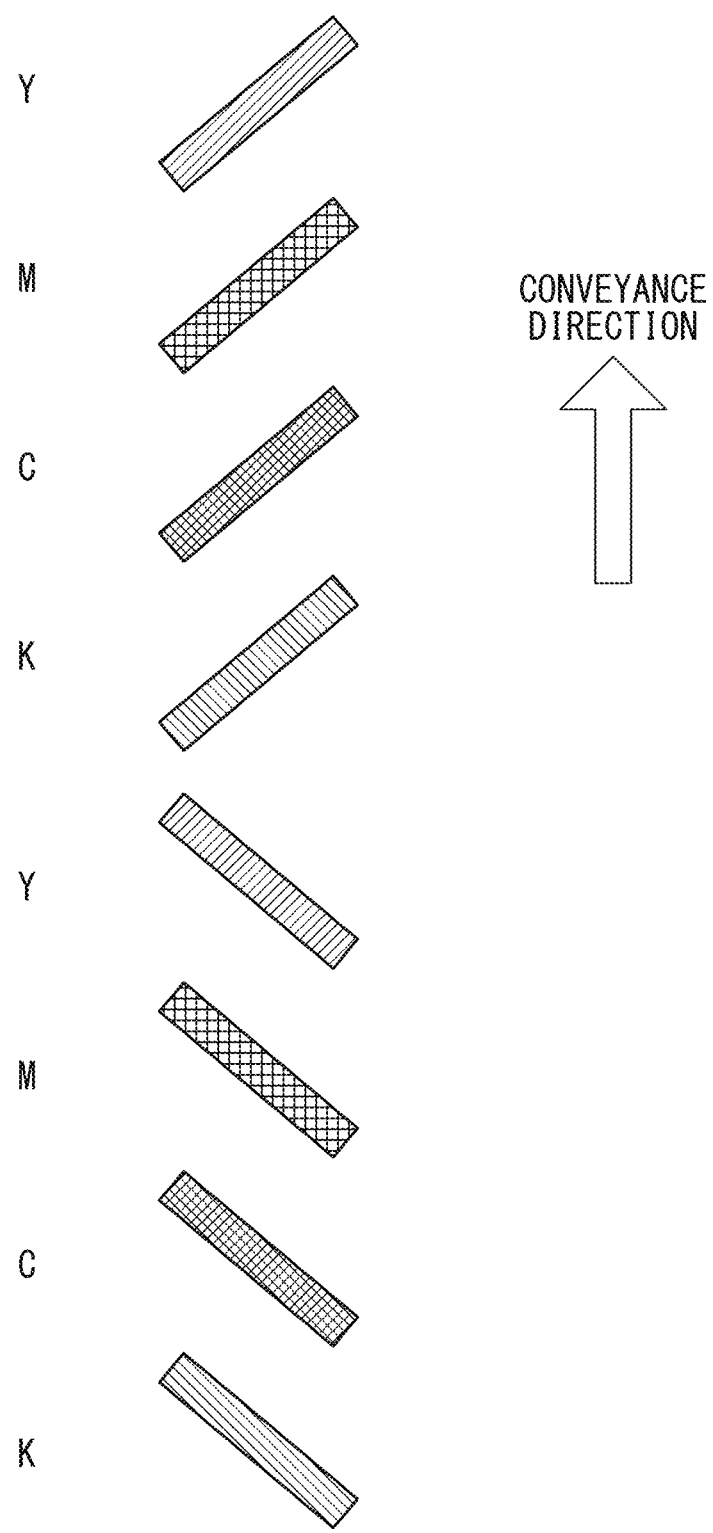
FIG. 5 is an explanatory diagram of first pattern images for detecting color misregistration.

FIG. 5 is an explanatory diagram of first pattern images for the color misregistration detection. The first pattern images include color patterns of yellow, which is a reference color, and color patterns of other colors (magenta, cyan, and black). The color patterns are images formed to be inclined at a predetermined angle (for example, 45°) with respect to the conveyance direction of the intermediate transfer belt 5. Two pattern images of the same colors are formed. The pattern images of the same colors are formed to be inclined in different directions with respect to the conveyance direction of the intermediate transfer belt 5.

The first pattern images are used in the case where the first PD 711 receives the specularly reflected light of the light emitted from the first LED 701. For example, when an amount of the reflected light from the intermediate transfer belt 5 is a predetermined amount or more, the color misregistration amount is detected with the use of the first pattern images. When a gloss of the front surface of the intermediate transfer belt 5 is not reduced, an amount of the specularly reflected light from the front surface of the intermediate transfer belt 5 becomes larger than an amount of specularly reflected light from the first pattern images. Therefore, an analog signal value corresponding to a result of receiving the reflected light from a region (front surface of the intermediate transfer belt 5) in which the first pattern images are not formed becomes higher than an analog signal value corresponding to a result of receiving the reflected light from the first pattern images.

Figure 6:
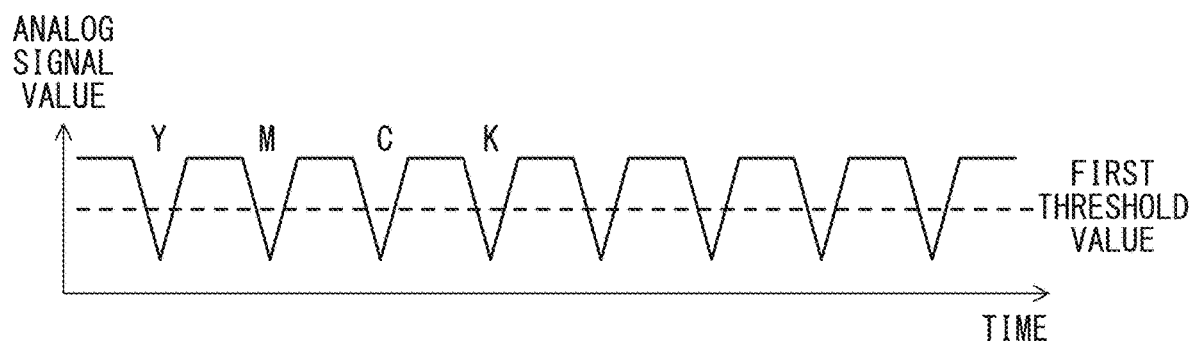
FIG. 6 is a graph for showing an example of an analog signal corresponding to a result of detecting the first pattern images for detecting the color misregistration.

FIG. 6 is a graph for showing an example of an analog signal in a case where reflected light from the first pattern images is detected by the first LED 701 and the first PD 711. An analog signal value of the first PD 711 obtained when reflected light from a color pattern is received is lower than an analog signal value of the first PD 711 obtained when the reflected light from the front surface of the intermediate transfer belt 5 is received.

The CPU 109 is configured to convert the analog signal into a binary signal indicating a first level or a second level based on a first threshold value. The converted signal corresponds to a result of comparison between the analog signal value (FIG. 6) and the first threshold value. At this time, the CPU 109 determines the first threshold value based on an analog signal value obtained when the specularly reflected light from the front surface of the intermediate transfer belt 5 of the light emitted from the first LED 701 is received by the first PD 711. Then, the CPU 109 detects a color misregistration amount of the color pattern of the first pattern images based on the binary signal described above. The color misregistration correction is a known technology, and a detailed description thereof is omitted here.

Figure 7A:
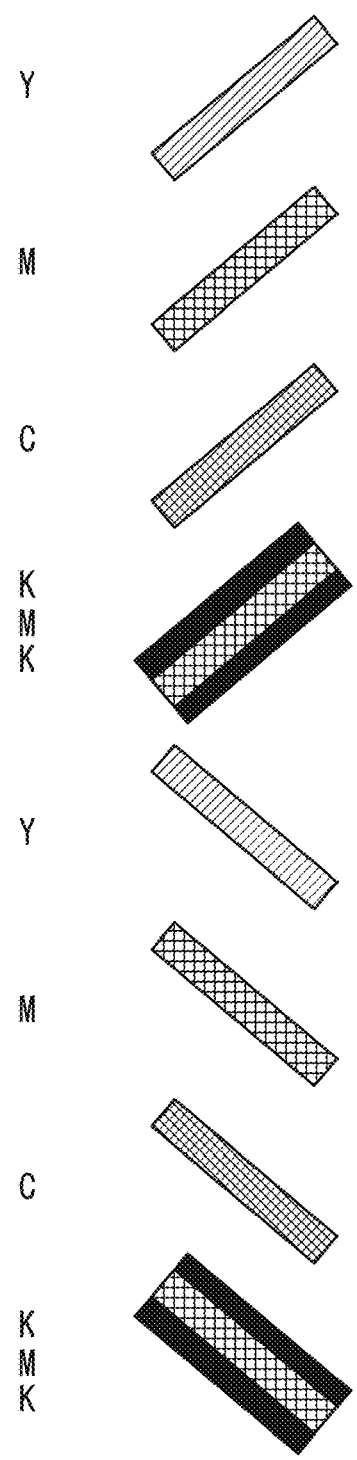
FIG. 7A and FIG. 7B are explanatory diagrams of second pattern images for detecting color misregistration.
Figure 7B:
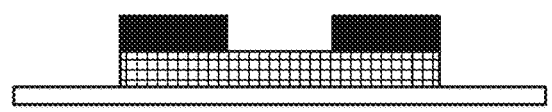

FIG. 7A and FIG. 7B are explanatory diagrams of second pattern images for the color misregistration detection. The second pattern images include color patterns of yellow, which is a reference color, and color patterns of other colors (magenta, cyan, and black). It should be noted, however, that the color patterns of black of the second pattern images are formed to be superimposed on the color patterns of magenta. The second pattern images are used when scattered reflected light of the light emitted from the second LED 702 is received by the first PD 711. In other words, when the amount of the reflected light from the intermediate transfer belt 5 is not the predetermined amount or more, a color misregistration amount is detected with the use of the second pattern images. In other words, when the amount of reflected light from the intermediate transfer belt 5 is less than the predetermined amount, the color misregistration amount is detected with the use of the second pattern images.

Figure 8:
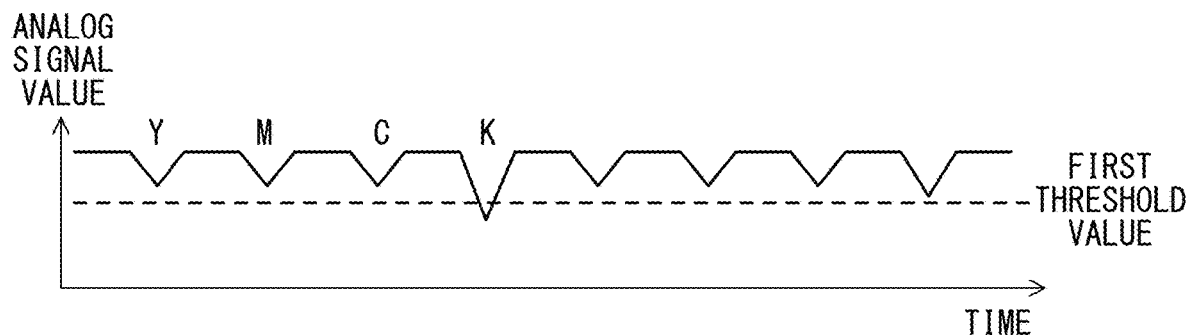
FIG. 8 is a graph for showing an example of an analog signal corresponding to a result of detecting the first pattern images for detecting the color misregistration.

When the gloss of the intermediate transfer belt 5 is reduced by wearing of the intermediate transfer belt 5, the amount of specularly reflected light from the front surface of the intermediate transfer belt 5 is reduced. FIG. 8 is a graph for showing an example of an analog signal obtained when the reflected light from the first pattern images formed on the intermediate transfer belt 5, which has the reduced amount of specularly reflected light, is detected by the first LED 701 and the first PD 711. When the amount of specularly reflected light from the intermediate transfer belt 5 is reduced, as shown in FIG. 6, a difference between the analog signal value obtained when specularly reflected light from the color patterns of respective colors is received and the analog signal value obtained when the specularly reflected light from the intermediate transfer belt 5 is received is reduced. Therefore, there is a fear that the CPU 109 cannot detect the color misregistration amount from the binary signal with high accuracy.

Figure 9:
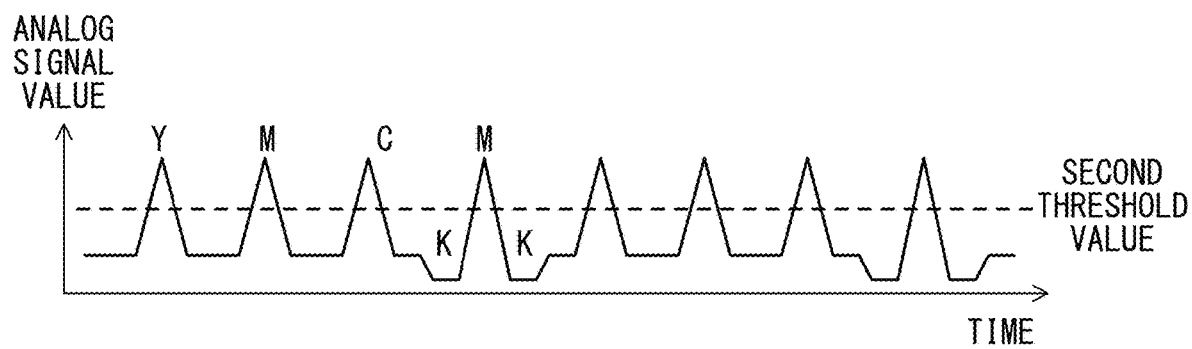
FIG. 9 is a graph for showing an example of an analog signal corresponding to a result of detecting the second pattern images for detecting the color misregistration.

To address this problem, under a state in which the amount of specularly reflected light from the intermediate transfer belt 5 is reduced, the second pattern images are formed, and scattered reflected light from the second pattern images is detected by the optical sensor 7. The optical sensor 7 receives scattered reflected light of the light emitted from the second LED 702 by the first PD 711. FIG. 9 is a graph for showing an example of an analog signal obtained when reflected light from the second pattern images formed on the intermediate transfer belt 5, which has the reduced amount of specularly reflected light, is detected by the second LED 702 and the first PD 711.

As illustrated in FIG. 7A, the second pattern images are different from the first pattern images. Specifically, the color patterns of black are superimposed on the color patterns of magenta. When the color patterns of black are detected with the use of scattered reflected light, the light emitted from the second LED 702 is absorbed by a black toner. Therefore, a difference between the amount of scattered reflected light from the color patterns of only black and the amount of scattered reflected light from the intermediate transfer belt 5 becomes extremely smaller. In each of the color patterns of black of the second pattern images, a pattern formed with the use of a magenta toner is exposed from a gap of patterns formed at an interval with the use of the black toner. This is called a "composite pattern". A cross-sectional view of the composite pattern is illustrated in FIG. 7B. A result of detecting the second pattern images including the composite patterns is shown in FIG. 9. An analog signal value corresponding to scattered reflected light from the composite pattern is a value corresponding to scattered reflected light from a region of the composite pattern formed with the use of the magenta toner. The interval between the patterns of the black toner is determined in advance, and hence the CPU 109 can determine a color misregistration amount of the color patterns of black based on a relative position between the region of the composite pattern formed with the use of the magenta toner and the reference color patterns using a yellow toner.

The CPU 109 is configured to convert the analog signal (FIG. 9) into a binary signal indicating the first level or the second level based on a second threshold value. The converted signal corresponds to a result of comparison between the analog signal value (FIG. 9) and the second threshold value. At this time, the CPU 109 determines the second threshold value based on an analog signal value obtained when the scattered reflected light from the front surface of the intermediate transfer belt 5 of the light emitted from the second LED 702 is received by the first PD 711. Then, the CPU 109 detects a color misregistration amount of the color pattern of the second pattern images based on the binary signal described above. The color misregistration correction using a composite pattern is a known technology, and a detailed description thereof is omitted here.

In the image forming apparatus 100 according to at least one embodiment, the color misregistration amount of the image is detected with the use of the above-mentioned pattern images (first pattern images and second pattern images). The CPU 109 detects positions of the color patterns of respective colors to calculate relative positions of the pattern images of other colors with respect to the pattern images of the reference color (yellow). The CPU 109 determines the color misregistration amounts of respective colors based on differences between the calculated relative positions and a target relative position. The CPU 109 controls timings of writing by the exposure devices 15a to 15d based on the determined color misregistration amounts to perform the color misregistration correction. Moreover, the CPU 109 may correct image data based on the detected color misregistration so that the color misregistration amounts of the image to be formed by the image forming unit 10 are suppressed, for example. The reference color is not limited to yellow, and may be magenta or cyan. Moreover, there may be adopted a configuration in which, in response to a user selecting a color misregistration detection mode via an operation panel (not shown), the CPU 109 selects the specular reflection color misregistration detection or the scattered reflection color misregistration detection.

Test Image

Figure 10A:
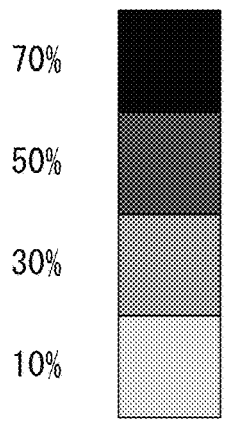
FIG. 10A and FIG. 10B are explanatory diagrams of test images for detecting an image density.
Figure 10B:
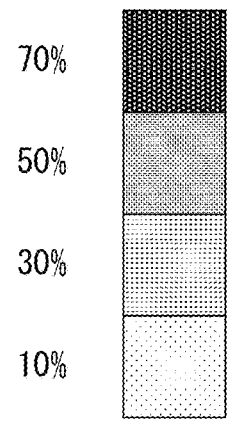

FIG. 10A and FIG. 10B are explanatory diagrams of test images for the image density detection. In FIG. 10A, an example of a first test image for the image density detection to be detected with the specularly reflected light is illustrated. In FIG. 10B, an example of a second test image for the image density detection to be detected with scattered reflected light is illustrated.

The first test image is used when the specularly reflected light of the light emitted from the first LED 701 is received by the first PD 711. The first test image is used in detecting an image density of black, in particular. The black toner absorbs light, and hence an amount of scattered reflected light from a test image of black is extremely small. Therefore, when a density of an image formed by the black toner is to be detected, the CPU 109 detects specularly reflected light from the test image of black. The first test image is formed of a gradation pattern of four image densities: 70%, 50%, 30%, and 10%. The image forming unit 10 forms the first test image based on an image signal value of the test image data. The image signal value of the test image data is determined in advance.

The first test image formed on the intermediate transfer belt 5 is read by the optical sensor 7. The analog signal output from the first PD 711 is converted to the digital signal by the A/D converter 110. The CPU 109 controls the image forming condition for the image density based on a difference between the digital signal value and a target value. For example, the CPU 109 controls an intensity of laser light emitted from the exposure device 15d by the image forming controller 101 to adjust the image density of black.

Figure 11:
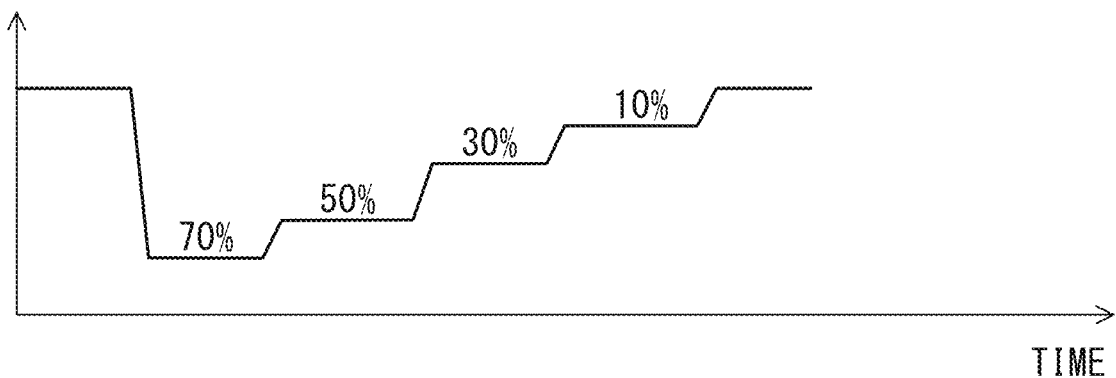
FIG. 11 is a graph for showing an example of an analog signal corresponding to a result of detecting a first test image for detecting the image density.

FIG. 11 is a graph for showing an example of an analog signal obtained when reflected light from the first test image is detected by the first LED 701 and the first PD 711. The image of the density of 70%, which is the highest density of the first test image, is reduced in amount of specularly reflected light because a toner adhesion amount is large in addition to the fact that the light is absorbed by the black toner. Therefore, the analog signal value output by the optical sensor 7 (first PD 711) is reduced. The image of the density of 10%, which is the lowest density of the first test image, is reduced in amount of light absorbed by the black toner as compared to the case of the density of 70%, and the toner adhesion amount is reduced, with the result that the amount of the specularly reflected light is increased. Therefore, the analog signal value output by the optical sensor 7 (first PD 711) is increased.

The second test image is used when scattered reflected light of light emitted from the second LED 702 is received by the second PD 712. The second test image is used in detecting image densities of chromatic colors, such as yellow, magenta, and cyan, in particular. Image densities for yellow, magenta, and cyan are detected with the use of scattered reflected light. The second test image is formed of a gradation pattern of four densities: 70%, 50%, 30%, and 10%. In FIG. 10B, a test image of yellow is illustrated. The second test images of the colors: yellow, magenta, and cyan are formed on the intermediate transfer belt 5.

The second test image formed on the intermediate transfer belt 5 is read by the optical sensor 7. The analog signal output from the second PD 712 is converted to the digital signal by the A/D converter 110. The CPU 109 controls the image forming condition for the image density based on a difference between the digital signal value and a target value. In this manner, the CPU 109 adjusts the image densities of yellow, magenta, and cyan.

Figure 12:
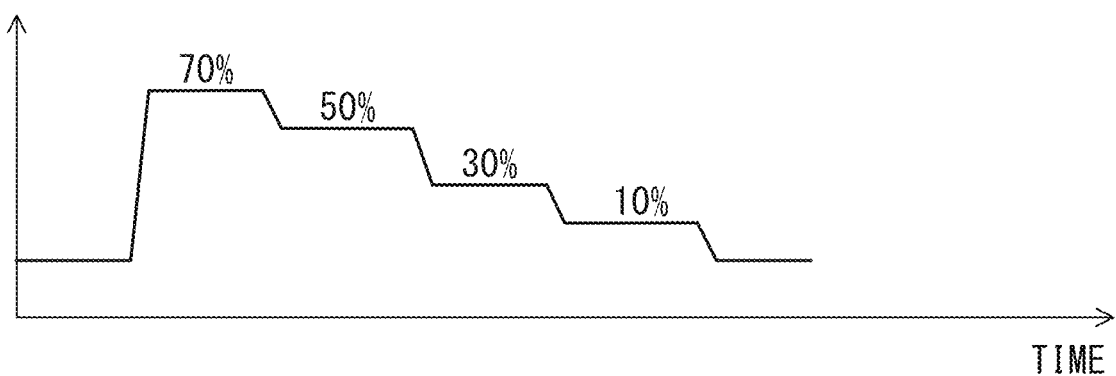
FIG. 12 is a graph for showing an example of an analog signal corresponding to a result of detecting a second test image for detecting the image density.

FIG. 12 is a graph for showing an example of an analog signal obtained when reflected light from the second test image is detected by the second LED 702 and the second PD 712. An analog signal of the second test image for yellow is illustrated here. The image of the density of 70%, which is the highest density of the second test image, is increased in amount of scattered reflected light because a toner adhesion amount is large in addition to the fact that the light is reflected by the yellow toner. Therefore, the analog signal value output by the optical sensor 7 (second PD 712) is increased. The image of the density of 10%, which is the lowest density of the second test image, is reduced in amount of light reflected by the yellow toner as compared to the case of the density of 70%, and the amount of the scattered reflected light is reduced. Therefore, the analog signal value output by the optical sensor 7 (second PD 712) is reduced. Analog signals obtained with the second test images of magenta and cyan exhibit similar tendencies.

Detection Region of Optical Sensor

Figure 13:
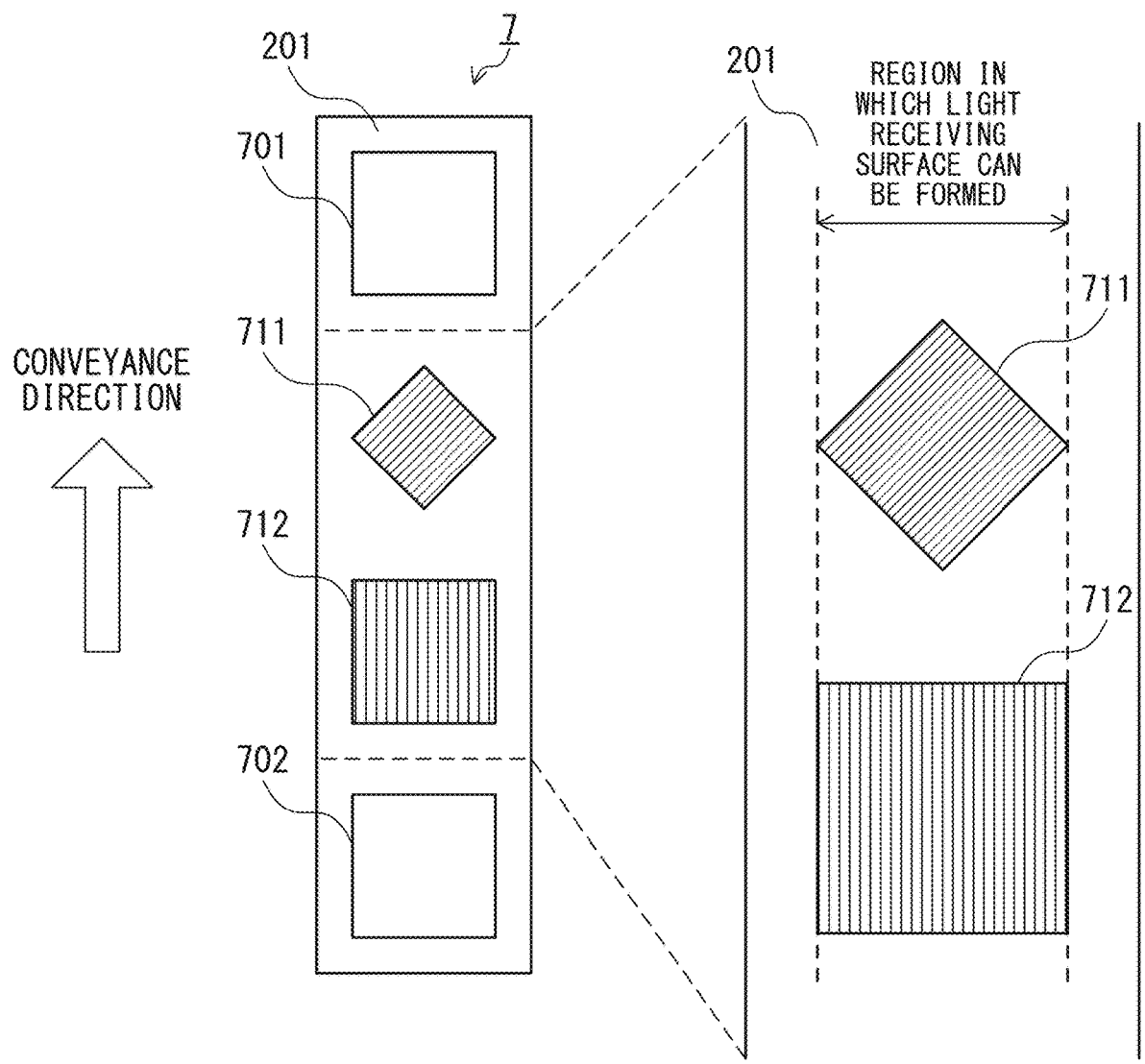
FIG. 13 is an explanatory diagram of a light receiving surface of the optical sensor.

FIG. 13 is an explanatory diagram of a light receiving surface of the optical sensor 7. FIG. 13 is a diagram of the optical sensor 7 as seen from the intermediate transfer belt 5 side, in which shapes of a light receiving surface of the first PD 711 and a light receiving surface of the second PD 712 on the substrate 201 are illustrated. The light receiving surface of the first PD 711 and the light receiving surface of the second PD 712 both have rectangular shapes, but have different sizes and are formed at different angles. In this example, the light receiving surface of the second PD 712 is formed to be larger than the light receiving surface of the first PD 711. Moreover, the light receiving surface of the first PD 711 and the light receiving surface of the second PD 712 are formed at angles that are different from each other by 5° or more. The light receiving surface has the same shape as that of a detection region. The formation angle is defined as, when a longitudinal direction of the substrate 201 is assumed as a reference line, a smaller one of angles between the reference line and diagonals of the light receiving surface.

The light receiving surface of the first PD 711 is formed so that two sides are inclined at a predetermined angle with respect to the conveyance direction of the intermediate transfer belt 5. The inclination angle of the light receiving surface of the first PD 711 with respect to the conveyance direction of the intermediate transfer belt 5 is the same as an angle (for example, 45°) at which each color pattern of the pattern images for detecting the color misregistration is inclined with respect to the conveyance direction of the intermediate transfer belt 5. A length of one side of the light receiving surface of the first PD 711 is equal to a length of a width of the color pattern. A width of a diagonal of the light receiving surface of the first PD 711 is equal to the maximum width of a region of the optical sensor 7 in which the light receiving surface can be formed. With the light receiving surface of the first PD 711 being thus formed to be inclined, a rising edge and a falling edge of the analog signal output by the first PD 711 when receiving reflected light from the pattern images can be made steep. Therefore, the color misregistration amount can be detected with high accuracy.

Figure 14A:
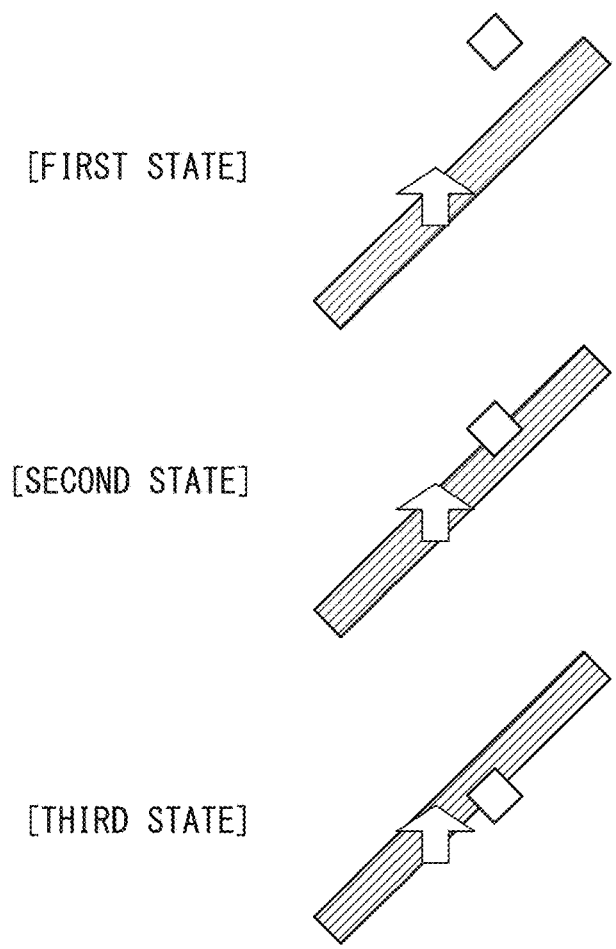
FIG. 14A is comprised of explanatory diagrams of detection states of a first PD.
Figure 14B:
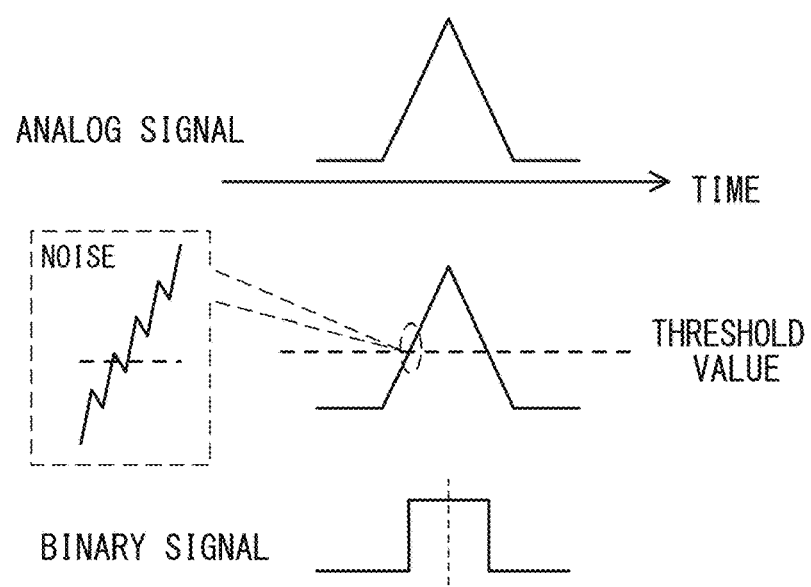
FIG. 14B is comprised of explanatory graphs of an analog signal.

FIG. 14A and FIG. 14B are explanatory diagrams and explanatory graphs of detection states of the first PD 711 and an analog signal as a detection result. In FIG. 14A and FIG. 14B, the case of detecting the pattern images for detecting the color misregistration is described. As illustrated in FIG. 14A, the detection region having the same shape as the light receiving surface of the first PD 711 is provided at the same inclination as the inclination of a pattern image with respect to the conveyance direction of the intermediate transfer belt 5. The pattern image is conveyed in the direction of the arrow by the intermediate transfer belt 5 to pass the detection region of the first PD 711. As a result, an analog signal output by the first PD 711 has the steepest rising edge and falling edge as illustrated in FIG. 14B. In FIG. 14B, an analog signal obtained when a second pattern image is measured is illustrated.

In a case where a position of each color pattern of the pattern images is detected based on a binary signal obtained by converting the analog signal based on a threshold value, when the rising edge and the falling edge of the analog signal are steeper, the result is less affected by signal noise. When signal noise occurs in the analog signal, for example, the edges of the binary signal are varied due to the noise to cause a fluctuation in position of the pattern image to be detected. The fluctuation amount becomes smaller when the rising edge and the falling edge of the analog signal become steeper. Therefore, a detection error can be reduced. For this reason, it is desired to reduce an area of the light receiving surface of the first PD 711 for use in detecting the color misregistration.

Moreover, the light receiving surface of the second PD 712 receives scattered reflected light of the second LED 702. A result of detection by the second PD 712 is used to detect the image density. In order to detect the image density accurately, it is desired for the second PD 712 to be able to detect a wider detection region evenly. In order to detect a test image of a low density, which reflects a low amount of light, it is preferred that the second PD 712 receive as much light as possible to secure an S/N. To this end, the light receiving surface of the second PD 712 is formed in a direction orthogonal to the conveyance direction of the intermediate transfer belt 5 up to limits or boundaries of a region in which the light receiving surface of the optical sensor 7 can be formed. With this configuration, the second PD 712 secures the maximum S/N without increasing the size of the optical sensor 7.

As described above, the optical sensor 7 has the first PD 711 and the second PD 712 formed on the substrate 201, and a light receiving area of the first PD 711 is smaller than a light receiving area of the second PD 712. As a result, the light receiving elements for detecting the color misregistration and for detecting the image density are formed in the shapes, the formation angles, and the sizes suited for their usages. Therefore, the color misregistration amount and the image density can be detected with high accuracy without increasing the size of the optical sensor 7.

Color Misregistration Correction

Figure 15:
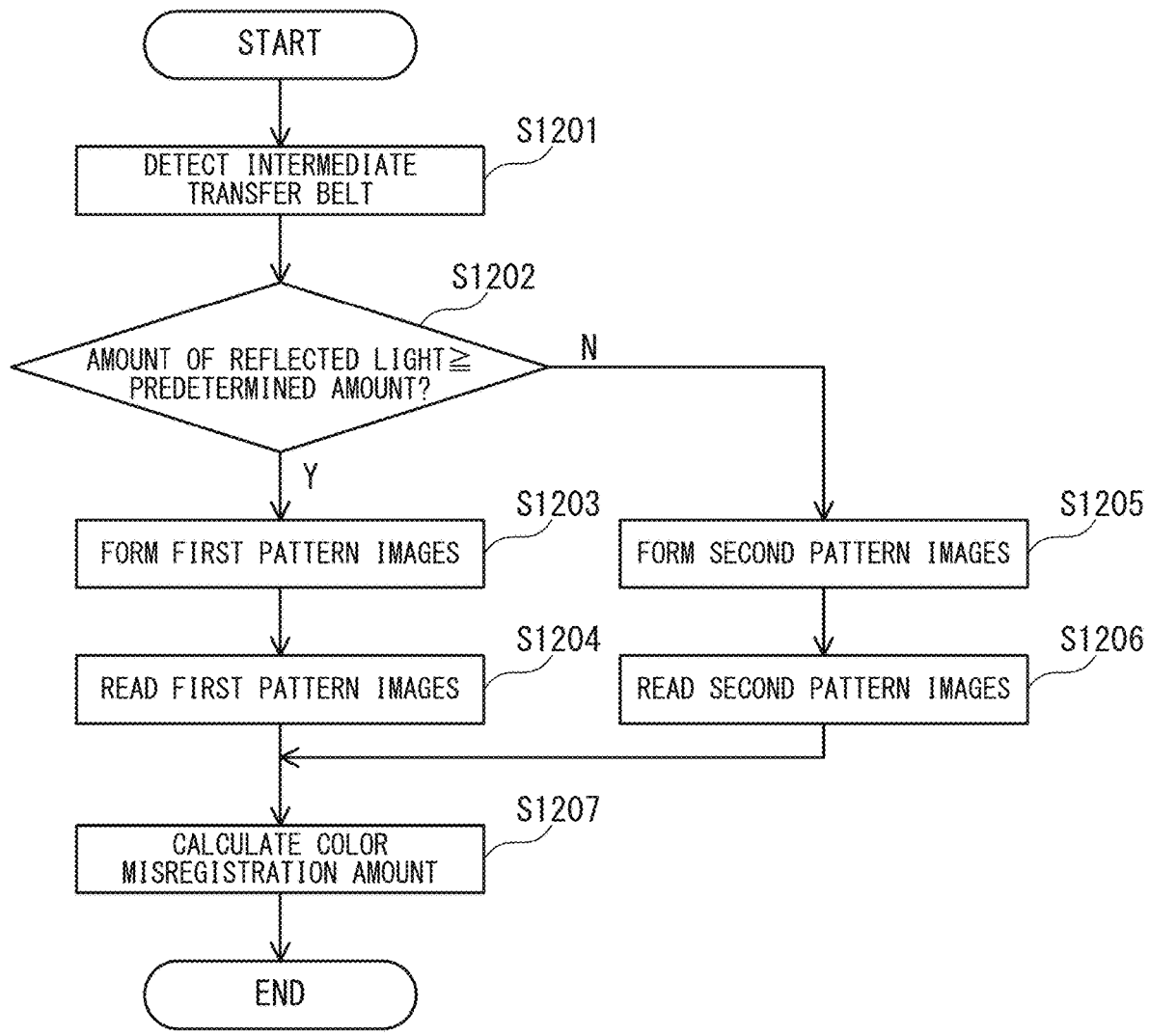
FIG. 15 is a flow chart for illustrating color misregistration detection processing.

FIG. 15 is a flow chart for illustrating processing of detecting the color misregistration amounts in at least one embodiment.

The CPU 109 first detects the amount of light reflected on the front surface of the intermediate transfer belt 5 by the optical sensor 7 (Step S1201). The CPU 109 controls the first LED 701 to emit light. An image is not formed on the intermediate transfer belt 5 at this time, and hence the light from the first LED 701 irradiates the front surface of the intermediate transfer belt 5. The first PD 711 receives the specularly reflected light from the front surface of the intermediate transfer belt 5 to output an analog signal corresponding to the amount of specularly reflected light. The CPU 109 acquires the analog signal from the first PD 711 to detect the amount of light reflected by the front surface of the intermediate transfer belt 5.

The CPU 109 determines whether the acquired amount of light reflected by the front surface of the intermediate transfer belt 5 is the predetermined amount or more (Step S1202). Through this processing, the CPU 109 determines whether the gloss of the front surface of the intermediate transfer belt 5 is high.

When the amount of light reflected by the front surface of the intermediate transfer belt 5 is the predetermined amount or more (Step S1202: Y), the CPU 109 determines that the gloss of the front surface of the intermediate transfer belt 5 is not reduced. In this case, the CPU 109 detects the color misregistration amount with the use of the first pattern images. In other words, the CPU 109 transfers pattern image data P1 to the image forming controller 101, and controls the image forming controller 101 to form the first pattern images on the intermediate transfer belt 5 (Step S1203). The CPU 109 controls the first LED 701 to emit light, and reads the first pattern images formed on the intermediate transfer belt 5 by the first PD 711 (Step S1204). In Step S1204, the CPU 109 acquires the analog signal output from the first PD 711. The CPU 109 calculates the color misregistration amount from the result of detecting the first pattern images of respective colors of yellow, magenta, cyan, and black (Step S1207). The CPU 109 stores the calculated color misregistration amount in the memory (not shown).

When the amount of light reflected by the front surface of the intermediate transfer belt 5 is less than the predetermined amount (Step S1202: N), the CPU 109 determines that the gloss of the front surface of the intermediate transfer belt 5 is reduced. In this case, the CPU 109 detects the color misregistration amount with the use of the second pattern images. In other words, the CPU 109 transfers pattern image data P2 to the image forming controller 101, and controls the image forming controller 101 to form the second pattern images on the intermediate transfer belt 5 (Step S1205). The CPU 109 controls the second LED 702 to emit light, and reads the second pattern images formed on the intermediate transfer belt 5 by the first PD 711 (Step S1206). In Step S1206, the CPU 109 acquires the analog signal output from the first PD 711. Then, the CPU 109 controls the processing to proceed to Step S1207. The CPU 109 calculates the color misregistration amount based on the result of detecting the second pattern images of respective colors of yellow, magenta, cyan, and black (Step S1207). After the processing of Step S1207 is complete, the CPU 109 ends the processing of detecting the color misregistration amount.

When the image forming apparatus 100 is to form an image on the sheet, the CPU 109 reads the color misregistration amount from the memory, and corrects image forming positions of the images to be formed based on the image data in accordance with the color misregistration amount.

As described above, the CPU 109 uses the pattern images (first pattern images and second pattern images) for the color misregistration detection corresponding to the result of detecting the gloss of the intermediate transfer belt 5 to acquire the color misregistration amount with an optimal combination of a light emitter and a light receiver. In the processing of detecting the color misregistration amount, the same element (first PD 711) is used on the light receiving side. The position of the light receiving element (first PD 711) is fixed, and hence detection accuracy of the color misregistration amount is increased as compared to the case in which the first pattern images and the second pattern images are detected by different light receiving elements. Therefore, the CPU 109 can detect an accurate color misregistration amount to perform accurate color misregistration correction.

Image Density Correction

Figure 16:
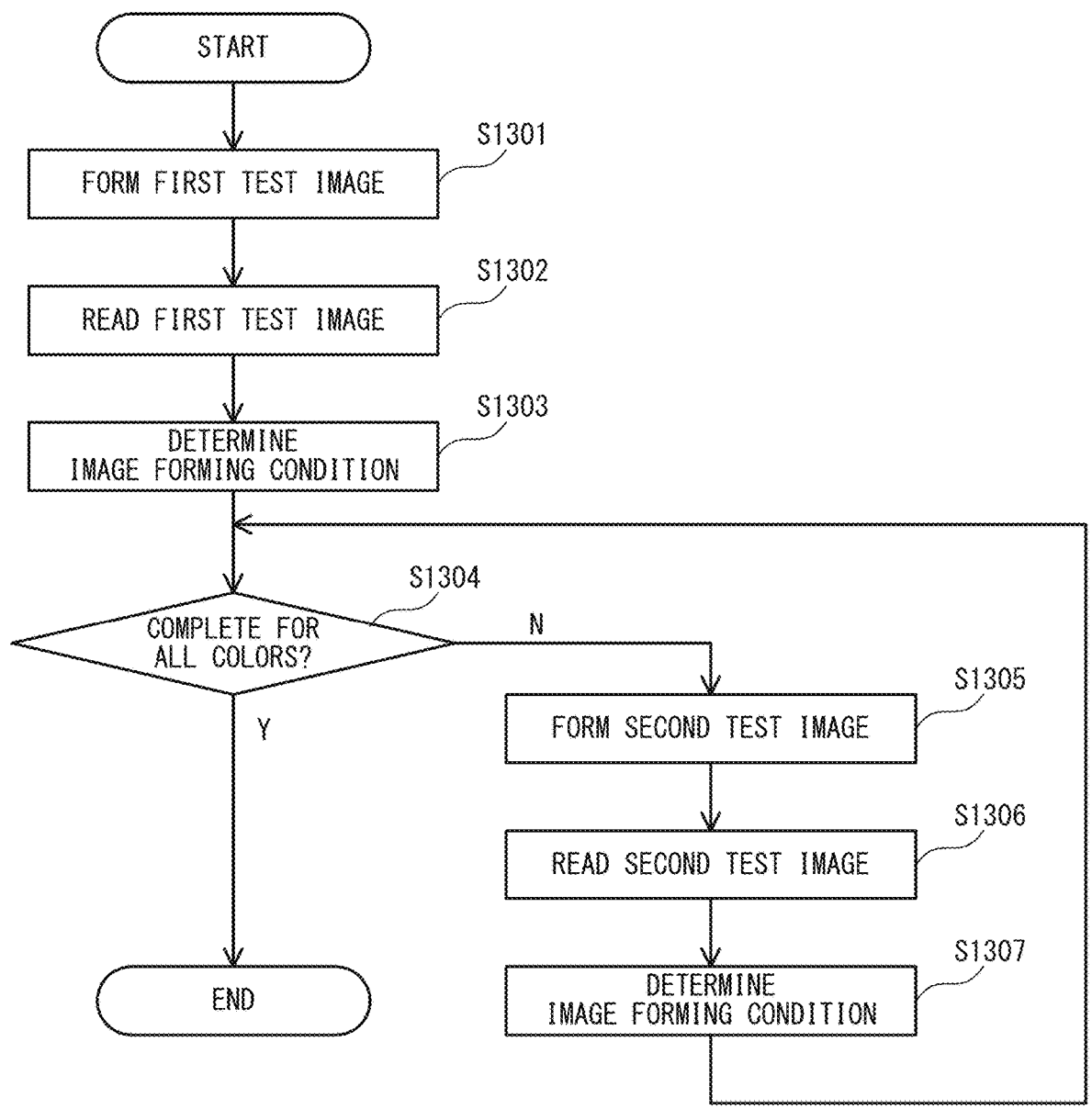
FIG. 16 is a flow chart for illustrating image density detection processing.

FIG. 16 is a flow chart for illustrating image density detection processing in at least one embodiment. In at least one embodiment, a description is given of a case in which the image density detection for the chromatic colors is performed after the image density detection for black, but the order may be reversed.

The CPU 109 transfers test image data TK to the image forming controller 101, and controls the image forming controller 101 to form the test image of black (first test image) on the intermediate transfer belt 5 (Step S1301). The CPU 109 controls the first LED 701 to emit light, and acquires the analog signal from the first PD 711, which has received the specularly reflected light, to read the test image of black (Step S1302). The CPU 109 converts a level of the analog signal corresponding to the read test image of black into a digital signal value by the A/D converter 110. The CPU 109 determines the image forming condition for the image density based on the digital signal value (Step S1303). In Step S1303, the CPU 109 determines, as the image forming condition regarding the image density for black, a correction amount of an intensity of laser light of the exposure device 15*d*, and stores the correction amount in the memory (not shown). When the black image is to be formed, the CPU 109 reads the correction amount from the memory, and controls the density of the black image to be formed by the image forming unit 10 in accordance with the correction amount.

After calculating the correction amount of the image density for black, the CPU 109 determines whether the image density detection processing has been performed for all colors of yellow, magenta, and cyan (Step S1304).

When the image density detection has not been performed for all colors (Step S1304: N), the CPU 109 first performs the image density detection for yellow. In other words, the CPU 109 transfers test image data TY to the image forming controller 101, and controls the image forming controller 101 to form the test image of yellow (second test image) on the intermediate transfer belt 5 (Step S1305). The CPU 109 controls the second LED 702 to emit light, and acquires the analog signal from the second PD 712, which has received the scattered reflected light, to read the test image of yellow (Step S1306). The CPU 109 converts a level of the analog signal corresponding to the read test image of yellow into a digital signal value by the A/D converter 110. The CPU 109 determines the image forming condition for the image density based on the digital signal value (Step S1307). In Step S1307, the CPU 109 determines, as the image forming condition regarding the image density for yellow, a correction amount of an intensity of laser light of the exposure device 15*a*, and stores the correction amount in the memory (not shown). When the yellow image is to be formed, the CPU 109 reads the correction amount from the memory, and controls the density of the yellow image to be formed by the image forming unit 10 in accordance with the correction amount.

The CPU 109 repeatedly performs the processing of Step S1305 to Step S1307 until the image density detection processing is ended for all colors. When the image density detection processing has been performed for all colors of yellow, magenta, and cyan (Step S1304: Y), the CPU 109 ends the image density detection processing.

As described above, the CPU 109 uses the test image (first test image, second test image) for the image density detection corresponding to the color to be detected to acquire the image density with an optimal combination of a light emitter and a light receiver. Therefore, the CPU 109 can detect a correction amount of an accurate image density to perform accurate image density correction.

As described above, the image forming apparatus 100 according to at least one embodiment includes the optical sensor 7 having elements bonded on the same substrate 201 by die bonding and wire bonding. Moreover, in order to detect the color misregistration amount and to detect the image density, the optical sensor 7 includes the light receiving elements that are different in size of the light receiving surface and in formation angle. Therefore, the size and the cost of the optical sensor 7 itself can be reduced. The image forming apparatus 100 uses the optical sensor 7 in both of a specularly reflected light method and a scattered reflected light method. Moreover, the image forming apparatus 100 separately prepares the detection image for use in the specularly reflected light method and the detection image for use in the scattered reflected light method.

In the processing of detecting the color misregistration amount, the image forming apparatus 100 can achieve the detection of the pattern images suitable for the state of the intermediate transfer belt 5 by combining the first LED 701, the second LED 702, and the first PD 711 in an optimal manner. With the shape of the detection region of the first PD 711 being formed to be inclined with respect to the conveyance direction of the intermediate transfer belt 5 in accordance with the shape of the pattern image, the color misregistration amount can be detected with high accuracy. Moreover, in the image density detection processing, through an optimal combination of the first LED 701, the second LED 702, the first PD 711, and the second PD 712, the image forming apparatus 100 can achieve the detection of the test image that is suited for the color of the test image. The second PD 712, which is configured to receive the scattered reflected light of the light from the second LED 702 to detect the image density, is formed to have the detection region that is larger than the detection region of the first PD 711. As a result, the image density can be detected with high accuracy for a chromatic-color test image.

In order to maximize the detection ability of the optical sensor 7, it is required to compensate for the positional relationship among the elements with high accuracy. In the optical sensor 7, the first LED 701, the second LED 702, the first PD 711, and the second PD 712 are bonded to the substrate 201 by die bonding and wire bonding, and hence the first LED 701 and the first PD 711 used in the specularly reflected light method are positioned accurately. Meanwhile, positioning among other elements can be performed with a margin. Therefore, assembly operation of the optical sensor 7 becomes easier than in the related art. As described above, the optical sensor 7 according to the present disclosure can be downsized while enabling the measurement suited for different objects to be measured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-168418, filed Sep. 10, 2018 which is hereby incorporated by reference herein in its entirety.

What is claimed is:

1. An image forming apparatus, comprising:
an image forming unit configured to form an image;
an image bearing member configured to bear the image formed by the image forming unit;
a transfer portion at which the image is transferred from the image bearing member onto a sheet;
a sensor configured to detect reflected light from a detection image formed on the image bearing member; and
a controller configured to control the image forming unit to form the detection image on the image bearing member, and control the sensor to detect the reflected light from the detection image,
wherein the sensor includes:
a substrate;
a first light emitting element provided on the substrate;
a second light emitting element provided on the substrate;
a first light receiving element, which is provided on the substrate, and is configured to receive specularly reflected light from the detection image in a case in which the first light emitting element irradiates the detection image with light; and
a second light receiving element, which is provided on the substrate, and is configured to receive scattered reflected light from the detection image in a case where in which the second light emitting element irradiates the detection image with light, and
wherein an area of a light receiving surface of the first light receiving element is smaller than an area of a light receiving surface of the second light receiving element.

2. The image forming apparatus according to claim 1,
wherein the light receiving surface of the first light receiving element has a rectangular shape, and is formed so that sides of the rectangular shape are inclined at a predetermined angle with respect to a direction in which the image is conveyed by the transfer portion, and
wherein the light receiving surface of the second light receiving element has a rectangular shape, and is formed in a region in which a light receiving surface is formable such that, in a direction orthogonal to the direction in which the image is conveyed by the transfer portion, the light receiving surface is formed up to limits of the region.

3. The image forming apparatus according to claim 1, wherein the first light receiving element is configured to receive scattered reflected light from the detection image in a case in which the second light emitting element irradiates the detection image with light.

4. The image forming apparatus according to claim 1,
wherein the image forming unit includes a plurality of image forming units configured to form images of different colors,
wherein the controller is configured to control a black image forming unit included in the plurality of image forming units to form a black detection image, control the first light emitting element to emit light, control the first light receiving element to receive specularly reflected light from the black detection image, and control a density of an image to be formed by the black image forming unit based on a result of receiving the specularly reflected light by the first light receiving element, and
wherein the controller is configured to control another image forming unit included in the plurality of image forming units to form a chromatic-color detection image, control the second light emitting element to emit light, control the second light receiving element to receive scattered reflected light from the chromatic-color detection image, and control a density of an image to be formed by the other image forming unit based on a result of receiving the scattered reflected light by the second light receiving element.

5. The image forming apparatus according to claim 1,
wherein the image forming unit includes a plurality of image forming units configured to form images of different colors, and
wherein the controller is configured to control the plurality of image forming units to form pattern images for use in detecting color misregistration, control the first light emitting element to emit light, control the first light receiving element to receive specularly reflected light from the pattern images, and control the detected color misregistration.

6. The image forming apparatus according to claim 1,
wherein the image forming unit includes a plurality of image forming units configured to form images of different colors, and
wherein the controller is configured to control the plurality of image forming units to form pattern images for use in detecting color misregistration, control the second light emitting element to emit light, control the first light receiving element to receive scattered reflected light from the pattern images, and control the detected color misregistration.

7. The image forming apparatus according to claim 1,
wherein the first light emitting element, the first light receiving element, the second light receiving element, and the second light emitting element are arranged along a longitudinal direction of the substrate, and
wherein the first light receiving element and the second light receiving element are arranged between the first light emitting element and the second light emitting element.

8. An image forming apparatus, comprising:
an image bearing member;
a plurality of image forming units configured to form images of different colors on the image bearing member;
a transfer unit configured to transfer the images from the image bearing member onto a sheet;
a sensor having a substrate, a first light emitting element provided on the substrate, a second light emitting element provided on a surface of the substrate, a first light receiving element provided on the surface of the substrate, and a second light receiving element provided on the surface of the substrate, and configured to detect reflected light from a detection image formed on the image bearing member; and
a controller configured to:
control a black image forming unit included in the plurality of image forming units to form a black detection image;
control the first light emitting element to irradiate the black detection image with light;
obtain a first receiving result of specularly reflected light from the black detection image by the first light receiving element, in a case in which the first light emitting element irradiates the black detection image;
control a density of a black image to be formed by the black image forming unit based on the first receiving result;
control a color image forming unit included in the plurality of image forming units to form a color detection image;
control the second light emitting element to irradiate the color detection image with light;
obtain a second receiving result of scattered reflected light from the color detection image by the second light receiving element, in a case in which the second light emitting element irradiates the color detection image;
control a density of a color image to be formed by the color image forming unit based on the second receiving result;
control the plurality of image forming units to form a color misregistration detection image;
control the second light emitting element to irradiate the color misregistration detection image with light;
obtain a third receiving result of scattered reflected light from the color misregistration detection image by the first light receiving element, in a case in which the second light emitting element irradiates the color misregistration detection image; and
control the color registration of images having different colors to be formed by the plurality of image forming units,
wherein an area of a light receiving surface of the first light receiving element is smaller than an area of a light receiving surface of the second light receiving element.

9. The image forming apparatus according to claim 8,
wherein the first light emitting element, the first light receiving element, the second light receiving element, and the second light emitting element are arranged along a longitudinal direction of the substrate, and
wherein the first light receiving element and the second light receiving element are arranged between the first light emitting element and the second light emitting element.

10. The image forming apparatus according to claim 8,
wherein the light receiving surface of the first light receiving element has a rectangular shape,
wherein the light receiving surface of the second light receiving element has a rectangular shape, and
wherein an angle of an imaginary line connecting opposing corners of the light receiving surface of the second light receiving element is different from an angle of an imaginary line connecting opposing corners of the light receiving surface of the first light receiving element.

* * * * *